United States Patent
Zhu et al.

(10) Patent No.: US 11,836,022 B2
(45) Date of Patent: Dec. 5, 2023

(54) SYSTEM AND METHOD FOR USER EQUIPMENT-SIDE THERMAL MITIGATION

(71) Applicant: Verizon Patent and Licensing Inc., Basking Ridge, NJ (US)

(72) Inventors: Lily Zhu, Parsippany, NJ (US); Deepa Jagannatha, Bridgewater, NJ (US); Hui Zhao, Marlboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/655,830

(22) Filed: Mar. 22, 2022

(65) Prior Publication Data

US 2022/0214729 A1  Jul. 7, 2022

Related U.S. Application Data

(63) Continuation of application No. 16/752,291, filed on Jan. 24, 2020, now Pat. No. 11,301,012.

(51) Int. Cl.
*G06F 1/00* (2006.01)
*G06F 1/20* (2006.01)
*H04W 52/02* (2009.01)
*G06F 1/3287* (2019.01)

(52) U.S. Cl.
CPC ............ *G06F 1/206* (2013.01); *G06F 1/3287* (2013.01); *H04W 52/0251* (2013.01)

(58) Field of Classification Search
CPC .. G06F 1/206; G06F 1/3287; H04W 52/0251; Y02D 10/00; Y02D 30/70
See application file for complete search history.

(56) References Cited

U.S. PATENT DOCUMENTS

| | | | |
|---|---|---|---|
| 9,646,429 B2 | 5/2017 | Rousu et al. | |
| 10,206,134 B1 | 2/2019 | Kocagoez | |
| 2012/0272086 A1 | 10/2012 | Anderson et al. | |
| 2013/0166885 A1 | 6/2013 | Ramani et al. | |
| 2019/0379427 A1* | 12/2019 | Geekie | H01Q 25/04 |
| 2021/0152278 A1* | 5/2021 | Abdel Shahid | H04L 1/0003 |
| 2022/0007363 A1* | 1/2022 | Wang | H04W 36/0069 |

* cited by examiner

*Primary Examiner* — Xuxing Chen

(57) ABSTRACT

A user equipment may generate one or more temperature thresholds based on thermal mitigation guidelines. The one or more temperature thresholds may define a first temperature zone and a second temperature zone. The user equipment may detect a temperature of the user equipment. The user equipment may identify whether the temperature occurs in the first temperature zone or the second temperature zone. The user equipment may send information to a network device to cause one or more network actions to be performed. The one or more network actions may be configured to maintain or reduce the temperature within the first temperature zone or to reduce the temperature to cause the temperature to switch from the second temperature zone to the first temperature zone.

20 Claims, 7 Drawing Sheets

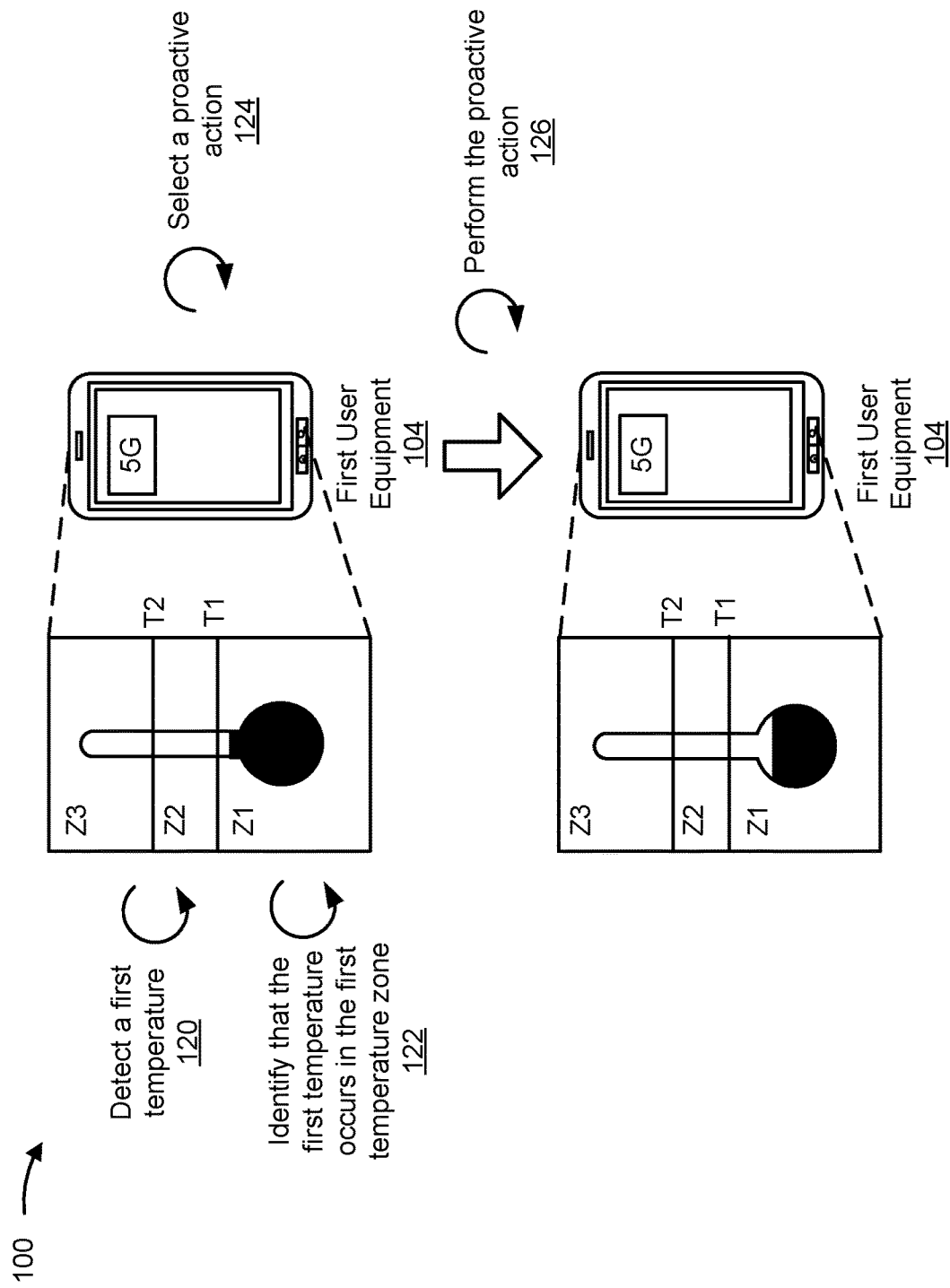

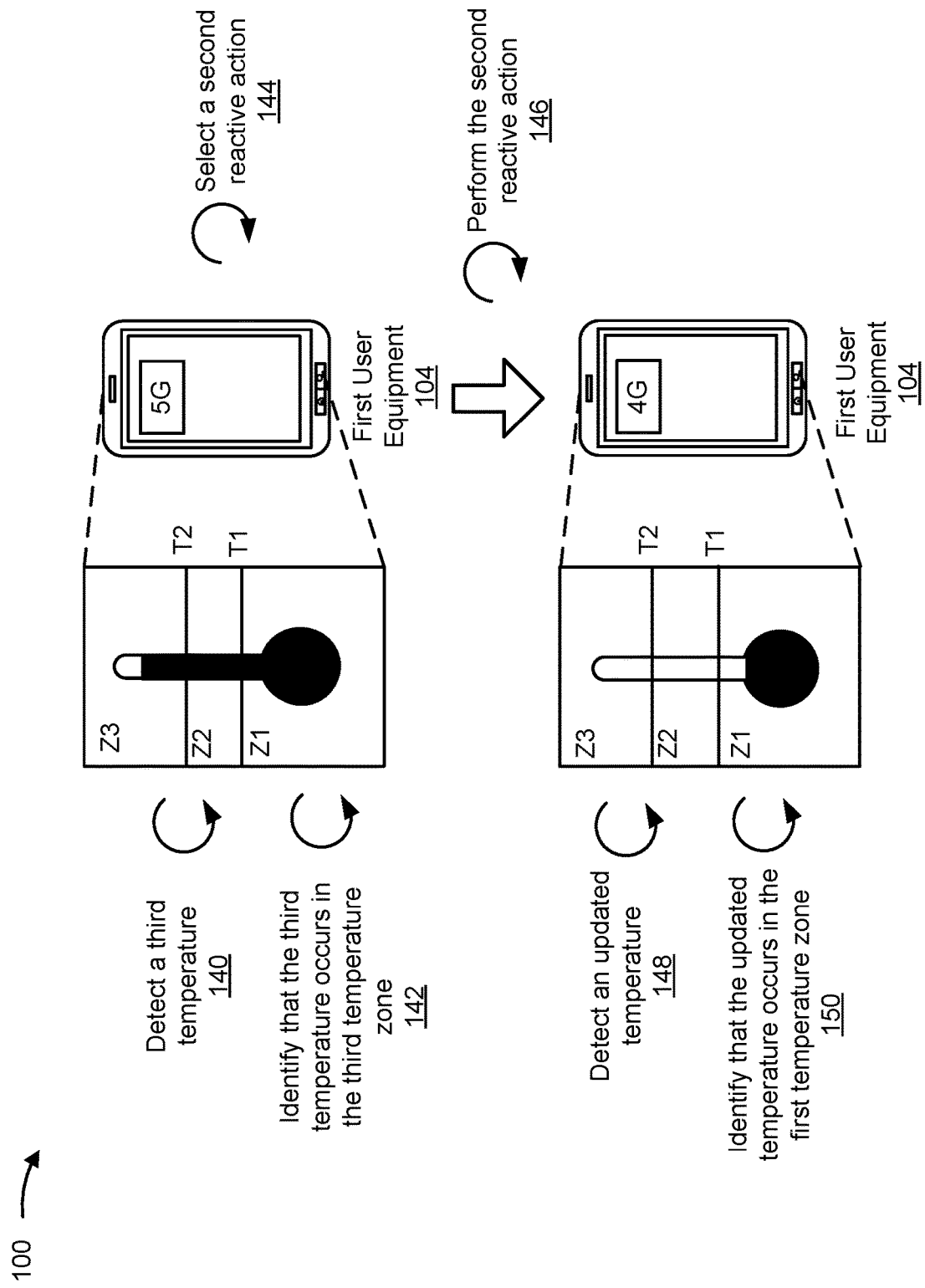

SYSTEM AND METHOD FOR USER EQUIPMENT-SIDE THERMAL MITIGATION

RELATED APPLICATION

This application is a continuation of U.S. patent application Ser. No. 16/752,291, entitled "SYSTEM AND METHOD FOR USER EQUIPMENT-SIDE THERMAL MITIGATION," filed Jan. 24, 2020, which is incorporated herein by reference in its entirety.

BACKGROUND

An individual may rely on user equipment (e.g., a smart phone) to communicate with others and/or access data via a network device (e.g., a base station). Often, the individual may maintain the user equipment in a powered-on state and in constant communication with a network. In some cases, the user equipment may be susceptible to overheating.

BRIEF DESCRIPTION OF THE DRAWINGS

FIGS. 1A-1D are diagrams of one or more example implementations described herein.

DETAILED DESCRIPTION OF PREFERRED EMBODIMENTS

Figure 1A:
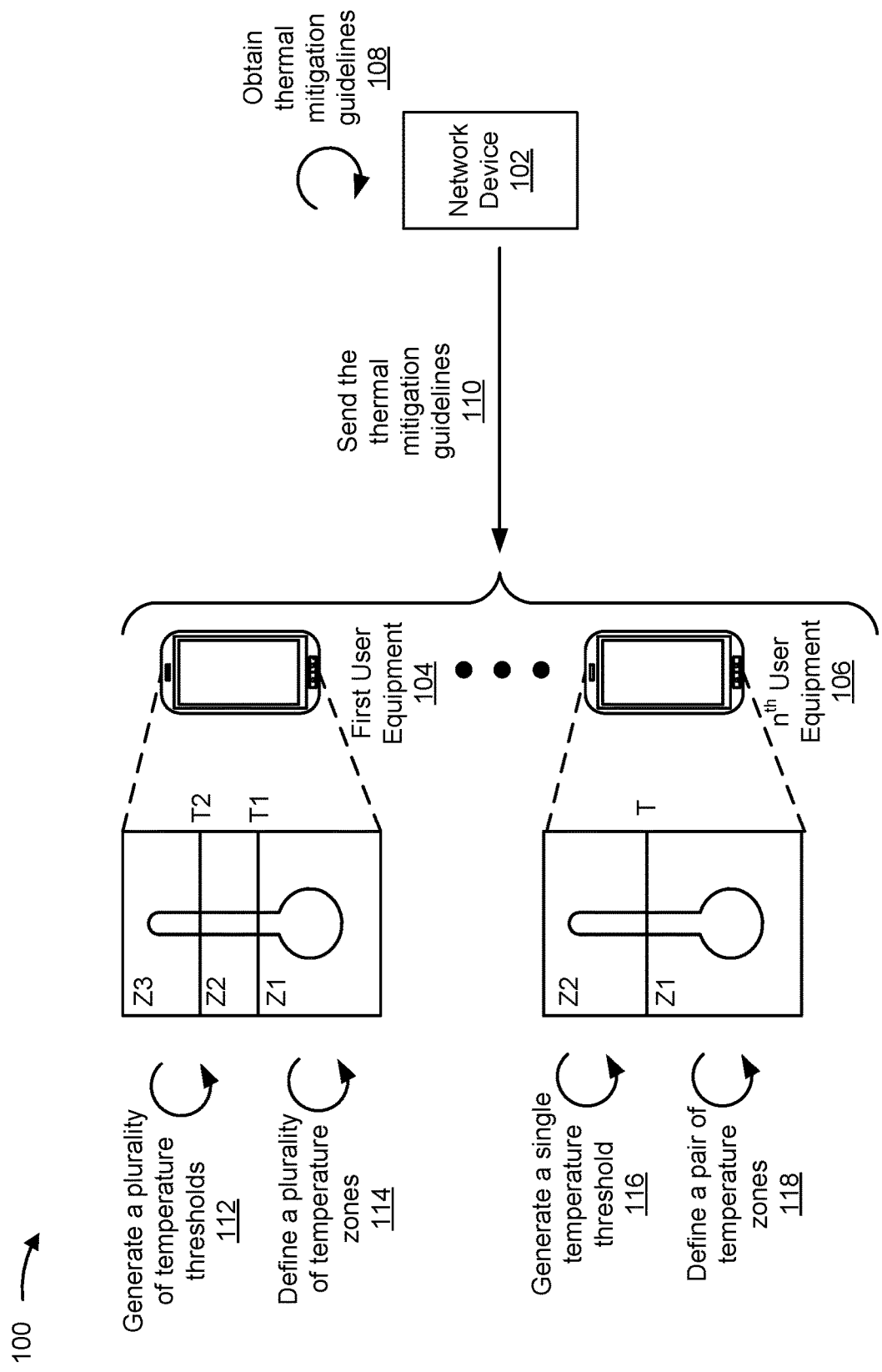

The following detailed description of example implementations refers to the accompanying drawings. The same reference numbers in different drawings may identify the same or similar elements.

In a fifth generation (5G) network, a base station (BS) may enable enhanced connectivity capabilities for users due to availability of a greater amount of bandwidth in a frequency range, such as a millimeter wave (mmWave) frequency range. For example, a user may use a user equipment (UE), such as a smart phone, smart watch, and/or the like, to communicate with a network via a BS to access large amounts of data and/or communicate with another device in a highly congested area (e.g., a football stadium, an arena, and/or the like).

The UE may also include hardware used to operate at more than one frequency band. In some cases, the UE may include separate chips for a 5G mmWave modem and 5G mmWave antenna modules. Faster network download speeds and/or the transmission of higher quantities of data, typically place a greater load on a UE's hardware. This increased usage may lead to more power consumption, which in turn may result in an increase in heat generated by the UE components. Heating of the UE may be further exacerbated by environmental factors, such as outside temperature, case design, and/or the like.

In some instances, an increase in temperature of the UE may trigger the UE to disconnect from the 5G network (e.g., switch to a fourth generation (4G) network), switch from 5G mmWave to 5G mid-band, and/or shut down. Such switching and/or shutting down may waste resources and impact user experience. For example, the UE may waste computing resources to shut down the UE, and later, to restore power to the UE. The UE and the BS may waste network resources re-establishing connectivity, restoring a session, and/or the like. Overheating may also physically damage the UE hardware (e.g., a processor, battery, and/or the like), leading to long-term performance problems and/or failure of the UE.

Some implementations described herein provide a UE that performs one or more thermal mitigation actions to maintain and/or reduce the temperature of the UE. The UE may receive thermal mitigation guidelines. The thermal mitigation guidelines may be applicable to a plurality of UEs and may provide a protocol to mitigate impact of temperature on the plurality of UEs. The UE may generate one or more temperature thresholds based on the thermal mitigation guidelines. The one or more temperature thresholds may define a plurality of temperature zones. The plurality of temperature zones may include a first temperature zone and a second temperature zone. The UE may detect a temperature of the UE. The UE may identify whether the temperature occurs in the first temperature zone or the second temperature zone. The UE may select a proactive action or a reactive action based on the temperature and whether the temperature occurs in the first temperature zone or the second temperature zone. The proactive action may be configured to maintain or reduce the temperature within the first temperature zone. The reactive action may be configured to reduce the temperature to cause the temperature to switch from the second temperature zone to the first temperature zone. The UE may selectively perform the proactive action or the reactive action to maintain or reduce the temperature of the UE.

By performing one or more thermal mitigation actions to maintain and/or reduce the temperature of the UE, the UE may eliminate a need for the UE to perform more drastic self-preservation measures, such as disconnecting from the 5G network and/or shutting down. Accordingly, the UE may conserve resources and improve user experience. In particular, the UE may conserve computing resources that might otherwise have been spent shutting down and later restoring power to the UE. Furthermore, the UE and/or a network device (e.g., a BS) may conserve network resources that might otherwise have been wasted re-establishing connectivity, restoring a session, and/or the like. By preventing the UE from overheating, the UE may also protect the hardware (e.g., processor, battery, and/or the like) and prevent resulting performance problems and/or failure of the UE.

Figure 1C:
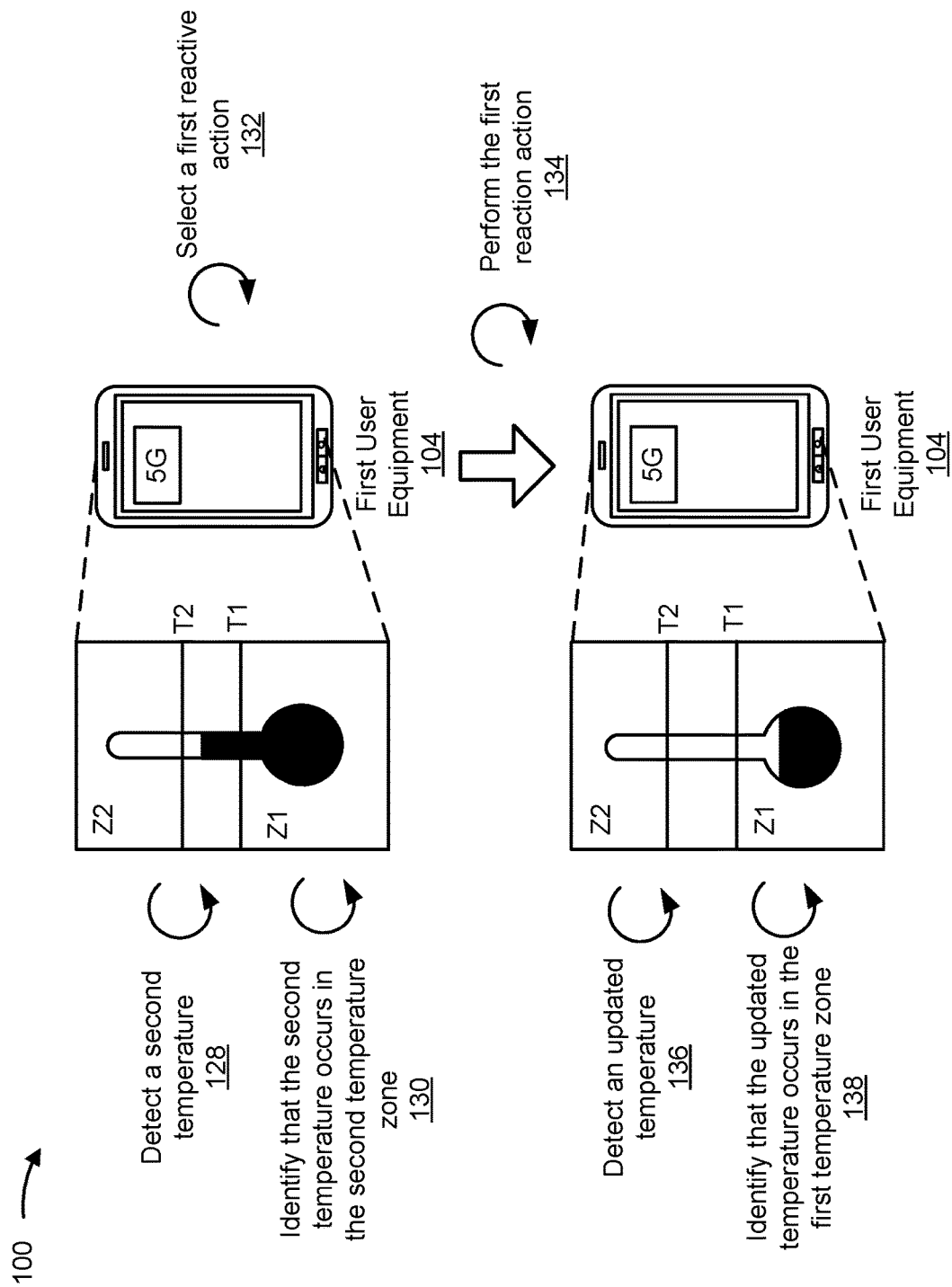

FIGS. 1A-1D are diagrams of one or more example implementations 100 described herein. FIG. 1A illustrates an example of a network device 102 (e.g., a base station, a network controller, and/or the like) interacting with a plurality of user equipment (UEs), which include a first UE 104 and an nth UE 106. FIGS. 1B-1D illustrate one or more examples of a UE (e.g., the first UE 104) maintaining and/or reducing a temperature of the UE.

In FIG. 1A, the network device 102 may provide network coverage over an area, which may be referred to as a cell. The cell may encapsulate and allow direct communication between each of the plurality of UEs and the network device 102. The plurality of UEs may have different characteristics. For example, the plurality of UEs may be different types of UEs, have different types and/or quantity of applications, different operating systems, be used in different environments and/or manners, and/or the like. Thus, the plurality of UEs may respond to temperature differently. Some UEs of the plurality of UEs may function at an optimal level while having a particular surface temperature, while other UEs of the plurality of UEs may experience lag and/or other functional deficiencies while having the particular surface temperature.

To implement a uniform system of thermal mitigation, the network device 102 may obtain thermal mitigation guidelines, as shown by reference number 108. For example, the network device 102 may obtain the thermal mitigation guidelines from a network operator responsible for a network associated with the network device 102. In some implementations, the network device 102 may obtain the thermal mitigation guidelines by generating the thermal mitigation guidelines (e.g., using a machine learning model, and/or the like). In some implementations, the network device 102 may obtain the thermal mitigation guidelines by reading the thermal mitigation guidelines from a storage device.

The thermal mitigation guidelines may be applicable to the plurality of UEs and may include a protocol to mitigate impact of temperature on the plurality of UEs. With respect to a UE of the plurality of UEs, the protocol may indicate that the UE is to generate one or more temperature thresholds and/or define a plurality of temperature zones based on characteristics of the UE. In some implementations, the protocol may indicate that the UE is to generate a particular quantity of temperature thresholds and/or define a particular quantity of temperature zones. For example, the protocol may indicate that the UE is to generate two temperature thresholds and/or define three temperature zones. In some implementations, the protocol may indicate that the UE is to generate one or more temperature thresholds within one or more ranges of temperature thresholds. For example, the protocol may indicate that the UE is to generate a temperature threshold between about 30 and 45 degrees Celsius, and/or the like. In some implementations, the protocol may indicate that the UE is to generate one or more temperature thresholds less than or equal to a maximum temperature threshold (e.g., about 43 degrees Celsius, and/or the like).

Additionally, or alternatively, the protocol may specify that the UE is to shift priorities between providing 5G network accessibility and ensuring that the UE does not become overheated as a temperature of the UE changes. For example, in a first temperature zone, where the temperature of the UE is normal, the protocol may specify that the UE is to prioritize 5G network accessibility over temperature reduction. As the temperature increases into a second temperature zone, the protocol may specify that the UE is to decrease 5G network accessibility to an extent in order to reduce the temperature. When the temperature enters a third temperature zone, which may include extreme temperatures, the protocol may specify that the UE is to prioritize temperature reduction over 5G network accessibility.

Additionally, or alternatively, the protocol may include a schedule for the UE to detect temperature of the UE. The schedule may indicate a frequency for detecting the temperature of the UE. The frequency may increase as the temperature of the UE increases. For example, the protocol may specify that the UE is to detect temperature according to a first frequency when the temperature is in the first temperature zone, according to a second frequency when the temperature is in the second temperature zone, and according to a third frequency when the temperature is in the third temperature zone. In such an example, the third frequency may be greater than the second frequency, and the second frequency may be greater than the first frequency.

Additionally, or alternatively, the protocol may include a list of possible thermal mitigation actions that the UE may perform to maintain and/or reduce the temperature of the UE. For example, the list may include reducing brightness of a display of the UE, placing the UE into a battery saver mode, placing the UE into an airplane mode, deactivating background data of the UE, closing one or more applications on the UE, disabling new radio on the UE, sending information to the network device 102 to cause the network device 102 to perform one or more network actions, and/or the like.

After obtaining the thermal mitigation guidelines, the network device 102 may send the thermal mitigation guidelines to the plurality of UEs (e.g., the first UE 104, the nth UE 106, and/or the like), as shown by reference number 110. The network device 102 may transmit the thermal mitigation guidelines via one or more packets. The network device 102 may broadcast the thermal mitigation guidelines, multicast the thermal mitigation guidelines, and/or the like. The network device 102 may send the thermal mitigation guidelines at a particular time, periodically, when one or more of the plurality of UEs connect to the network device 102, and/or the like.

Upon receipt of the thermal mitigation guidelines, a UE of the plurality of UEs may store the thermal mitigation guidelines in memory. The UE may parse the thermal mitigation guidelines to understand how to implement the protocol included in the thermal mitigation guidelines. To implement the protocol, the UE may generate one or more thresholds and/or define a plurality of temperature zones based on its characteristics (e.g., a type of the UE, types of applications running on the UE, a quantity of applications running on the UE, an environment of the UE, data usage of the UE, and/or the like).

For example, the first UE 104, based on its characteristics and on the thermal mitigation guidelines, may generate a plurality of temperature thresholds, as shown by reference number 112. The plurality of temperature thresholds may include a first temperature threshold (e.g., as indicated by "T1") and a second temperature threshold (e.g., as indicated by "T2"). For example, the first temperature threshold may be about 27 degrees Celsius, and the second temperature threshold may be about 43 degrees Celsius. Based on the plurality of temperature thresholds, the first UE 104 may define a plurality of temperature zones, as shown by reference number 114. The plurality of temperature zones may include a first temperature zone (e.g., as indicated by "Z1"), a second temperature zone (e.g., as indicated by "Z2"), and a third temperature zone (e.g., as indicated by "Z3"). Thus, the first temperature threshold may separate the first temperature zone from the second temperature zone, and the second temperature threshold may separate the second temperature zone from the third temperature zone. In some implementations, defining the plurality of temperature zones may be a byproduct of generating the plurality of temperature thresholds. In some implementations, generating the plurality of temperature thresholds may be a byproduct of defining the plurality of temperature zones.

As another example, the nth UE 106, based on its different characteristics and on the thermal mitigation guidelines, may generate a single temperature threshold, as shown by reference number 116. The single temperature threshold (e.g., as indicated by "T") may be, for example, about 40 degrees Celsius. Based on the single temperature threshold, the nth UE 106 may define a pair of temperature zones, as shown by reference number 118. The pair of temperature zones may include a first temperature zone (e.g., as indicated by "Z1") and a second temperature zone (e.g., as indicated by "Z2"). Thus, the temperature threshold may separate the first temperature zone from the second temperature zone. In some implementations, as described above, defining the pair of temperature zones may be a byproduct of generating the single temperature threshold. In some implementations, as described above, generating the single temperature threshold may be a byproduct of defining the pair of temperature zones.

To generate one or more temperature thresholds (e.g., the plurality of temperature thresholds, the single temperature threshold, and/or the like), a UE of the plurality of UEs may use one or more artificial intelligence techniques, such as machine learning, deep learning, and/or the like. Based on application of a rigorous and automated process associated with analyzing thousands or millions of data items, the UE may optimize thermal mitigation with minimal communication interruption.

In some implementations, the UE may obtain a machine learning model (also referred to herein as a first machine learning model) from the network device 102 for use in generating the one or more temperature thresholds. The network device 102 may train a machine learning model using historical information, such as historical information regarding UE characteristics (also referred to herein as UE characteristic parameters) (e.g., types of the UEs, types of applications running on the UEs, quantities of applications running on the UEs, environments of the UEs, data usage of the UEs, and/or the like); historical information regarding temperature thresholds (also referred to herein as temperature threshold parameters) (e.g., which temperature thresholds were generated, and/or the like); historical information regarding UE performance (also referred to as UE performance parameters) (e.g., how the UE performed at different temperatures, and/or the like); and/or the like.

In some implementations, the network device 102 may perform a data preprocessing operation when generating the machine learning model. In this way, the network device 102 may organize thousands, millions, or billions of data items for machine learning and machine learning model generation.

In some implementations, the network device 102 may perform a training operation when generating the machine learning model. For example, the network device 102 may portion the historical information into a training set (e.g., a set of information to train the machine learning model), a validation set (e.g., a set of information used to evaluate a fit of the machine learning model and/or to fine tune the machine learning model), a test set (e.g., a set of information used to evaluate a final fit of the machine learning model), and/or the like. In some implementations, the network device 102 may preprocess and/or perform dimensionality reduction to reduce the historical information to a minimum feature set. In some implementations, the network device 102 may train the machine learning model on this minimum feature set, thereby reducing processing to train the machine learning machine learning model, and may apply a classification technique, to the minimum feature set.

In some implementations, the network device 102 may use a classification technique, such as a logistic regression classification technique, a random forest classification technique, a gradient boosting machine learning (GBM) technique, and/or the like, to determine a categorical outcome (e.g., that one or more temperature thresholds are to be generated, and/or the like). Additionally, or alternatively, the network device 102 may use a naïve Bayesian classifier technique. In this case, the network device 102 may perform binary recursive partitioning to split the historical information of the minimum feature set into partitions and/or branches and use the partitions and/or branches to perform predictions (e.g., that a particular temperature of a UE will have a particular impact on performance of the UE). Based on using recursive partitioning, the network device 102 may reduce utilization of computing resources relative to manual, linear sorting and analysis of data items, thereby enabling use of thousands, millions, or billions of data items to train a machine learning model, which may result in a more accurate machine learning model than using fewer data items.

Additionally, or alternatively, the network device 102 may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the network device 102 may use one or more other machine learning model training techniques, such as a neural network technique, a latent semantic indexing technique, and/or the like. For example, the network device 102 may perform an artificial neural network processing technique (e.g., using a two-layer feedforward neural network architecture, a three-layer feedforward neural network architecture, and/or the like) to perform pattern recognition with regard to patterns of whether certain temperature thresholds were successful or not successful in indicating temperatures associated with performance deficiencies. In this case, using the artificial neural network processing technique may improve an accuracy of the machine learning model generated by the network device 102 by being more robust to noisy, imprecise, or incomplete data, and by enabling the network device 102 to detect patterns and/or trends undetectable to human analysts or systems using less complex techniques.

In some implementations, the UE may utilize the machine learning model, generated by the network device 102, to generate one or more temperature thresholds. In other words, the UE may input, into the machine learning model, data relating to one or more UE characteristic parameters of a UE, and the machine learning model may output data relating to one or more temperature thresholds.

In some implementations, a different device, such as a server device, may generate and train the machine learning model. The different device may send the machine learning model for use by the UE. The different device may update and send (e.g., on a scheduled basis, on an on-demand basis, on a triggered basis, on a periodic basis, and/or the like) the machine learning model to the UE. In some implementations, the UE may train and/or update the machine learning model based on changing characteristics of the UE (e.g., different types of applications, different quantity of applications, different environment, different data usage, and/or the like). Over time, utilizing the artificial intelligence techniques may conserve computing resources that would otherwise have been wasted performing ill-suited thermal mitigation actions (e.g., based on one or more temperature thresholds being too high, one or more temperature thresholds being too low, and/or the like).

To place the UE in condition for operation based on the thermal mitigation guidelines, in addition to the plurality of temperature thresholds and the plurality of temperature zones, the UE may store the schedule and/or the list of possible thermal mitigation actions in memory. In some implementations, based on its characteristics, the UE may determine a different schedule and/or a different list of possible thermal mitigation actions.

In FIGS. 1B-1D, recall that the first UE 104 generated the first temperature threshold and the second temperature threshold to define the first temperature zone, the second temperature zone, and the third temperature zone. Assume that the first temperature zone includes normal temperatures and is associated with optimal performance of the first UE 104, the second temperature zone includes elevated temperatures and is associated with sub-optimal performance of the first UE 104, and the third temperature zone includes extreme temperatures and is associated with a higher risk of damage to the first UE 104. Within the first temperature zone, the first UE 104 is configured to prioritize 5G network accessibility. Within the second temperature zone, the first UE 104 is configured to balance 5G network accessibility with temperature reduction. Within the third temperature zone, the first UE 105 is configured to prioritize temperature reduction.

Assume further that the system of thermal mitigation, as implemented by the first UE 104, includes a schedule for detecting temperatures and a list of possible thermal mitigation actions. The list of possible thermal mitigation actions may include proactive actions and reactive actions. The first UE 104 may select one or more of the proactive actions when a temperature of the first UE 104 occurs in the first temperature zone. The proactive actions may be configured to maintain and/or reduce the temperature within the first temperature zone. The first UE 104 may select one or more of the reactive actions when the temperature of the first UE 104 occurs in the second temperature zone or the third temperature zone. The reactive actions may be configured to reduce the temperature to cause the temperature to switch from the second temperature zone or the third temperature zone to the first temperature zone.

As shown by reference number 120 of FIG. 1B, the first UE 104 may detect a first temperature of the first UE 104 (e.g., using one or more sensors, and/or the like). The first UE 104 may detect the first temperature based on the schedule. The schedule may indicate a frequency for detecting temperature within the first temperature zone. For example, in the first temperature zone, the schedule may indicate that the first UE 104 is to detect temperature every 60 seconds, every two minutes, every ten minutes, and/or the like.

After detecting the first temperature, the first UE 104 may identify that the first temperature occurs in the first temperature zone, as shown by reference number 122. To do so, the first UE 104 may compare the first temperature with the first temperature threshold and/or the second temperature threshold. Because the first temperature does not satisfy the first temperature threshold or the second temperature threshold, the first UE 104 may determine that the first temperature occurs in the first temperature zone and is therefore a normal temperature. Thus, the first UE 104 may be configured to prioritize 5G network accessibility.

The first UE 104 may select a proactive action, as shown by reference number 124. The first UE 104 may select the proactive action based on the first temperature, identifying that the first temperature occurs in the first temperature zone, one or more performance factors of the first UE 104 (e.g., types of applications running on the first UE 104, a quantity of applications running on the first UE 104, an environment of the first UE 104, data usage of the first UE 104, thermal mitigation actions currently and/or previously performed on the first UE 104, and/or the like), and/or the like. In some cases, the first UE 104 may select the proactive action independent of the first temperature. In such cases, the first UE 104 may select the proactive action as a preventative measure. In some cases, the first UE 104 may select the proactive action based on the first temperature, such as based on a value of the first temperature, based on where the first temperature falls within the first temperature zone, based on how close the first temperature is to the first temperature threshold, and/or the like.

The first UE 104 may select the proactive action from the list of possible thermal mitigation actions. The proactive action may include one or more of reducing brightness of a display of the first UE 104, placing the first UE 104 into a battery saver mode, placing the first UE 104 into an airplane mode, deactivating background data of the first UE 104, closing one or more applications of the first UE 104, sending information to the network device 102 to cause the network device 102 to perform one or more network actions to maintain or reduce the first temperature, and/or the like. The information, sent to the network device 102, may indicate the first temperature, a type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like.

To select the proactive action, the first UE 104 may select the proactive action randomly from the list of possible thermal mitigation actions. In some cases, the first UE 104 may select the proactive action from the list based on a determination of potential impact of the proactive action on maintaining and/or reducing the first temperature. In such cases, actions within the list may be ranked from most potential impact on temperature to least potential impact on temperature. Differences in potential impact within the list may be attributed to different types of the actions (e.g., deactivating background data compared to reducing brightness of a display) or different degrees of application of the actions (e.g., closing one application compared to closing 10 applications).

In some implementations, the first UE 104 may identify a subset of the list that the first UE 104 has determined to be most applicable to the first temperature, the first temperature occurring in the first temperature zone, the one or more performance factors, and/or the like. The first UE 104 may select the proactive action randomly from the subset. In some cases, similar to that described above, the first UE 104 may select the proactive action from the subset based on a determination of potential impact on the first temperature. In such cases, actions within the subset may be ranked from most potential impact on temperature to least potential impact on temperature.

In some implementations, the UE may obtain a machine learning model (also referred to herein as a second machine learning model) from the network device 102 for use in selecting the proactive action. The network device 102 may train the machine learning model using historical information, such as historical information regarding UE characteristics (also referred to herein as UE characteristic parameters) (e.g., types of the UEs, types of applications running on the UEs, quantity of applications running on the UEs, environments of the UEs, data usage of the UEs, and/or the like); historical information regarding actions (also referred to herein as action parameters) (e.g., which actions were performed, if multiple actions were performed, in which order were the multiple actions performed, and/or the like); historical information regarding results of the actions (also referred to as result parameters) (e.g., whether a temperature was maintained and/or reduced, how much the temperature was reduced, an amount of time to reduce the temperature, and/or the like); and/or the like.

In some implementations, the first UE 104 may utilize the machine learning model, generated by the network device 102, to select the proactive action. In other words, the first UE 104 may input, into the machine learning model, data relating to one or more UE characteristic parameters of the first UE 104, and the machine learning model may output data relating to the proactive action.

In some implementations, a different device, such as a server device, may generate and train the machine learning model. The different device may send the machine learning model for use by the first UE 104. The different device may update and send (e.g., on a scheduled basis, on an on-demand basis, on a triggered basis, on a periodic basis, and/or the like) the machine learning model to the first UE 104. In some implementations, the first UE 104 may train and/or update the machine learning model. Over time, utilizing the machine learning model may conserve computing resources that would otherwise have been wasted performing ill-suited thermal mitigation actions.

It has been described that the first UE 104 uses a selection process to select the proactive action to perform. In practice, the first UE 104 may use any one or more of the selection processes described above, and/or one or more different selection processes, to select multiple actions to perform, may determine an order in which to perform the multiple actions, may use a result of one action to determine whether to perform another action, may use a result of one action to select which other action to perform, and/or the like.

After the first UE 104 selects the proactive action, the first UE 104 may perform the proactive action, as shown by reference number 126, to maintain and/or reduce the first temperature. For example, when performing the proactive action, the first UE 104 may modify a configuration of the first UE 104, may modify a manner in which the first UE 104 communicates with the network device 102 or a network with which the first UE 104 is associated, and/or the like.

In practice, similar to that described above, the first UE 104 may perform the proactive action by performing one or more actions. For example, the first UE 104 may perform the proactive action by reducing brightness of a display of the first UE 104. By doing so, the first UE 104 may conserve power and/or processing resources. Thus, the first UE 104 may reduce heat generated by a battery and/or a processor of the first UE 104. Additionally, or alternatively, the first UE 104 may perform the proactive action by placing the first UE 104 in a battery saver mode. By doing so, the first UE 104 may reduce heat generated by the battery. Additionally, or alternatively, the first UE 104 may perform the proactive action by deactivating background data of the first UE 104. By doing so, the first UE 104 may conserve power and/or processing resources used for beam transmission and thus reduces heat generated by the first UE 104. Additionally, or alternatively, the first UE 104 may perform the proactive action by closing one or more applications. By doing so, the first UE 104 conserves power and/or processing resources used to run the one or more applications and thus reduces heat generated by the first UE 104.

Additionally, or alternatively, the first UE 104 may perform the proactive action by sending information to the network device 102 to cause the network device 102 to perform one or more network actions to maintain or reduce the first temperature, and/or the like. The one or more network actions may include enabling connected mode discontinuous reception (cDRX) on the first UE 104, enabling a buffer-based deactivation of one or more secondary component carriers (SCCs) used by the first UE 104, reducing physical downlink control channel (PDCCH) monitoring, enabling cross-carrier scheduling, and/or the like. Similar to that described above, the network device 102 may select the one or more network actions from a list of network actions, may utilize a machine learning model to select the one or more network actions, and/or the like.

Thus, in the example of FIG. 1B, the first UE 104 may reduce the first temperature of the first UE 104 to an updated temperature while maintaining a 5G network connection. The first UE 104 may continue to detect temperatures of the first UE 104 according to the schedule (e.g., every 60 seconds, every two minutes, every ten minutes, and/or the like). Based on the temperatures and/or identifying that the temperatures occur in the first temperature zone, the first UE 104 may select a different proactive action, a same proactive action, a combination of proactive actions, and/or the like.

As shown by reference number 128 of FIG. 1C, the first UE 104 may detect a second temperature of the first UE 104 (e.g., using one or more sensors, and/or the like). The first UE 104 may detect the second temperature based on the schedule. The schedule may indicate a frequency for detecting temperature within the second temperature zone that is greater than the frequency for detecting temperature within the first temperature zone. For example, in the second temperature zone, the schedule may indicate that the first UE 104 is to detect temperature every 30 seconds, every minute, every five minutes, and/or the like.

After detecting the second temperature, the first UE 104 may identify that the second temperature occurs in the second temperature zone, as shown by reference number 130. To do so, the first UE 104 may compare the second temperature with the first temperature threshold and/or the second temperature threshold. Because the second temperature satisfies the first temperature threshold but does not satisfy the second temperature threshold, the first UE 104 may determine that the second temperature occurs in the second temperature zone and is therefore an elevated temperature. Thus, the first UE 104 may be configured to decrease 5G network accessibility to an extent in order to reduce the second temperature.

The first UE 104 may select a first reactive action, as shown by reference number 132. The first UE 104 may select the first reactive action based on the second temperature, identifying that the second temperature occurs in the second temperature zone, one or more performance factors of the first UE 104 (e.g., types of applications running on the first UE 104, a quantity of applications running on the first UE 104, an environment of the first UE 104, data usage of the first UE 104, thermal mitigation actions currently and/or previously performed on the first UE 104, and/or the like), and/or the like.

The first UE 104 may select the first reactive action from the list of possible thermal mitigation actions. The first reactive action may include one or more of reducing brightness of a display of the first UE 104, placing the first UE 104 into a battery saver mode, placing the first UE 104 into an airplane mode, deactivating background data of the first UE 104, closing one or more applications of the first UE 104, sending information to the network device 102 to cause the network device 102 to perform one or more network actions to reduce the second temperature, and/or the like. The information, sent to the network device 102, may indicate the second temperature, the type of the first UE 104, a type of wireless network connection used by the first UE 104, an operating mode of the first UE 104, a battery state of the first UE 104, a capability of the first UE 104, a location of the first UE 104, a thermal history of the first UE 104, and/or the like.

To select the first reactive action, the first UE 104 may select the first reactive action randomly from the list of possible thermal mitigation actions. In some cases, the first UE 104 may select the first reactive action from the list based on a determination of potential impact of the first reactive action on reducing the second temperature. In such cases, actions within the list may be ranked from most potential impact on temperature to least potential impact on temperature. Differences in potential impact within the list may be attributed to different types of the actions (e.g., deactivating background data compared to reducing brightness of a display) or different degrees of application of the actions (e.g., closing one application compared to closing 10 applications).

In some implementations, the first UE 104 may identify a subset of the list that the first UE 104 has determined to be most applicable to the second temperature, the second temperature occurring in the second temperature zone, the one or more performance factors, and/or the like. The first UE 104 may select the first reactive action randomly from the subset. In some implementations, similar to that described above, the first UE 104 may select the first reactive action from the subset based on a determination of potential impact on the second temperature. In such cases, actions within the subset may be ranked from most potential impact on temperature to least potential impact on temperature.

In some implementations, the first UE 104 may utilize the second machine learning model to select the first reactive action. To do so, the first UE 104 may input, into the second machine learning model, data relating to one or more UE characteristic parameters of the first UE 104, and the second machine learning model may output data relating to the first reactive action.

After the first UE 104 selects the first reactive action, the first UE 104 may perform the first reactive action, as shown by reference number 134, to reduce the second temperature. For example, when performing the first reactive action, the first UE 104 may modify a configuration of the first UE 104, may modify a manner in which the first UE 104 communicates with the network device 102 or a network with which the first UE 104 is associated, and/or the like.

In practice, similar to that described above, the first UE 104 may perform the first reactive action by performing one or more actions. For example, the first UE 104 may perform the first reactive action by reducing brightness of a display of the first UE 104. By doing so, the first UE 104 may conserve power and/or processing resources. Thus, the first UE 104 may reduce heat generated by a battery and/or a processor of the first UE 104. Additionally, or alternatively, the first UE 104 may perform the first reactive action by placing the first UE 104 in a battery saver mode. By doing so, the first UE 104 may reduce heat generated by the battery. Additionally, or alternatively, the first UE 104 may perform the first reactive action by deactivating background data of the first UE 104. By doing so, the first UE 104 may conserve power and/or processing resources used for beam transmission and thus reduces heat generated by the first UE 104. Additionally, or alternatively, the first UE 104 may perform the first reactive action by closing one or more applications. By doing so, the first UE 104 conserves power and/or processing resources used to run the one or more applications and thus reduces heat generated by the first UE 104.

Additionally, or alternatively, the first UE 104 may perform the first reactive action by sending information to the network device 102 to cause the network device 102 to perform one or more network actions to reduce second temperature. The one or more network actions may include deactivating one or more SCCs used by the first UE 104, enabling a buffer-based E-UTRAN NR dual connectivity (EN-DC) configuration, selectively disabling NR when the first UE 104 is on voice over long-term evolution (VoLTE), transmitting background data from the first UE 104 over long-term evolution (LTE), reducing PDCCH monitoring, enabling cross-slot scheduling, and/or the like. Similar to that described above, the network device 102 may select the one or more network actions from a list of network actions, may utilize a machine learning model to select the one or more network actions, and/or the like.

After performing the first reactive action, the first UE 104 may detect an updated temperature, as shown by reference number 136. The first UE 104 may detect the updated temperature using one or more sensors and/or based on the schedule. The first UE 104 may identify that the updated temperature occurs in the first temperature zone, as shown by reference number 138. To do so, the first UE 104 may compare the updated temperature with the first temperature threshold and/or the second temperature threshold. Because the updated temperature does not satisfy the first temperature threshold or the second temperature threshold, the first UE 104 may determine that the updated temperature occurs in the first temperature zone and is therefore a normal temperature.

Thus, in the example of FIG. 1C, the first UE 104 may reduce the second temperature of the first UE 104 to the updated temperature while substantially maintaining a 5G network connection. The first UE 104 may continue to detect temperatures of the first UE 104 according to the schedule (e.g., about every 60 seconds, about every two minutes, and/or the like). Based on the temperatures and/or identifying that the temperatures occur in the first temperature zone, the first UE 104 may select a proactive action, a combination of proactive actions, and/or the like.

In practice, the first UE 104 may use multiple iterations of thermal mitigation to reduce the second temperature to occur in the first temperature zone. For example, performance of the first reactive measure may not reduce the second temperature to occur in the first temperature zone. In such a case, the first UE 104 may repeat, one or more times, the detecting, the identifying, the selecting, and the performing until the first UE 104 identifies that an updated temperature of the first UE 104 occurs in the first temperature zone.

As shown by reference number 140 of FIG. 1D, the first UE 104 may detect a third temperature of the first UE 104 (e.g., using one or more sensors, and/or the like). The first UE 104 may detect the third temperature based on the schedule. The schedule may indicate a frequency for detecting temperature within the third temperature zone that is greater than the frequency for detecting temperature within the second temperature zone and/or the first temperature zone. For example, in the third temperature zone, the schedule may indicate that the first UE 104 is to detect temperature about every 10 seconds, about every 30 seconds, about every 60 seconds, and/or the like. In some implementations, the schedule may be the same for multiple temperature zones of the plurality of temperature zones (e.g., the first temperature zone and the second temperature zone, the second temperature zone and the third temperature zone, all of the plurality of temperature zones, and/or the like).

After detecting the third temperature, the first UE 104 may identify that the third temperature occurs in the third temperature zone, as shown by reference number 142. The first UE 104 may compare the third temperature with the first temperature threshold and/or the second temperature threshold. Because the third temperature satisfies the first temperature threshold and the second temperature threshold, the first UE 104 may determine that the third temperature occurs in the third temperature zone and is therefore an extreme temperature. Thus, the first UE 104 may prioritize temperature reduction over 5G network accessibility.

The first UE 104 may select a second reactive action, as shown by reference number 144. The first UE 104 may select the second reactive action based on the third temperature, identifying that the third temperature occurs in the third temperature zone, one or more performance factors of the first UE 104 (e.g., types of applications running on the first UE 104, a quantity of applications running on the first UE 104, an environment of the first UE 104, data usage of the first UE 104, thermal mitigation actions currently and/or previously performed on the first UE 104, and/or the like), and/or the like. The first UE 104 may select the second reactive action from the list of possible thermal mitigation actions. The second reactive action may include disabling NR, and/or the like.

To select the second reactive action, the first UE 104 may select the second reactive action randomly from the list of possible thermal mitigation actions. In some cases, the first UE 104 may select the second reactive action from the list based on a determination of potential impact of the second reactive action on reducing the third temperature. In such cases, actions within the list may be ranked from most potential impact on temperature to least potential impact on temperature. Differences in potential impact within the list may be attributed to different types of the actions (e.g., disabling NR compared to deactivating background data) or different degrees of application of the actions (e.g., closing all background applications compared to closing one application).

In some implementations, the first UE 104 may identify a subset of the list that first UE 104 has determined to be most applicable to the third temperature, the third temperature occurring in the third temperature zone, the one or more performance factors, and/or the like. The first UE 104 may select the second reactive action randomly from the subset. In some implementations, similar to that described above, the first UE 104 may select the second reactive action from the subset based on a determination of potential impact on the third temperature. In such cases, actions within the subset may be ranked from most potential impact on temperature to least potential impact on temperature.

In some implementations, the first UE 104 may utilize the second machine learning model to select the second reactive action. To do so, the first UE 104 may input, into the second machine learning model, data relating to one or more UE characteristic parameters of the first UE 104, and the second machine learning model may output data relating to the second reactive action.

After the first UE 104 selects the second reactive action, the first UE 104 may perform the second reactive action, as shown by reference number 146, to reduce the third temperature. For example, when performing the second reactive action, the first UE 104 may modify a configuration of the first UE 104, may modify a manner in which the first UE 104 communicates with the network device 102 or a network with which the first UE 104 is associated, and/or the like. In practice, similar to that described above, the first UE 104 may perform the second reactive action by disabling NR, and/or the like. By doing so, the first UE 104 may conserve power and/or processing resources used for data transmission and thus reduces heat generated by the first UE 104.

After performing the second reactive action, the first UE 104 may detect an updated temperature, as shown by reference number 148. The first UE 104 may detect the updated temperature using one or more sensors and/or based on the schedule. Assume that the first UE 104 identifies that the updated temperature occurs in the first temperature zone, as shown by reference number 150. To do so, the first UE 104 may compare the updated temperature with the first temperature threshold and/or the second temperature threshold. Because the updated temperature does not satisfy the first temperature threshold or the second temperature threshold, the first UE 104 may determine that the updated temperature occurs in the first temperature zone and is therefore a normal temperature.

Thus, in the example of FIG. 1D, the first UE 104 may reduce the third temperature of the first UE 104 to the updated temperature while not maintaining 5G network accessibility for at least some (if not all) of a time period to achieve the updated temperature. The first UE 104 may continue to detect temperatures of the first UE 104 according to the schedule (e.g., every 60 seconds, every two minutes, every ten minutes, and/or the like). Based on the temperatures and/or identifying that the temperatures occur in the first temperature zone, the first UE 104 may select a proactive action, a combination of proactive actions, and/or the like. After a time period, the first UE 104 may restore 5G network accessibility.

In practice, the first UE 104 may use multiple iterations of thermal mitigation to reduce the third temperature to occur in the first temperature zone. For example, performance of the second reactive measure may not reduce the third temperature to occur in the first temperature zone. In such an example, the first UE 104 may repeat, one or more times, the detecting, the identifying, the selecting, and the performing until the first UE 104 identifies that an updated temperature of the first UE 104 occurs in the first temperature zone.

As indicated above, FIGS. 1A-1D are provided merely as examples. Other examples are possible and may differ from what is described with regards to FIGS. 1A-1D. The number and arrangement of devices and networks shown in FIGS. 1A-1D are provided as one or more examples. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of FIGS. 1A-1D may perform one or more functions described as being performed by another set of devices of FIGS. 1A-1D.

Figure 2:
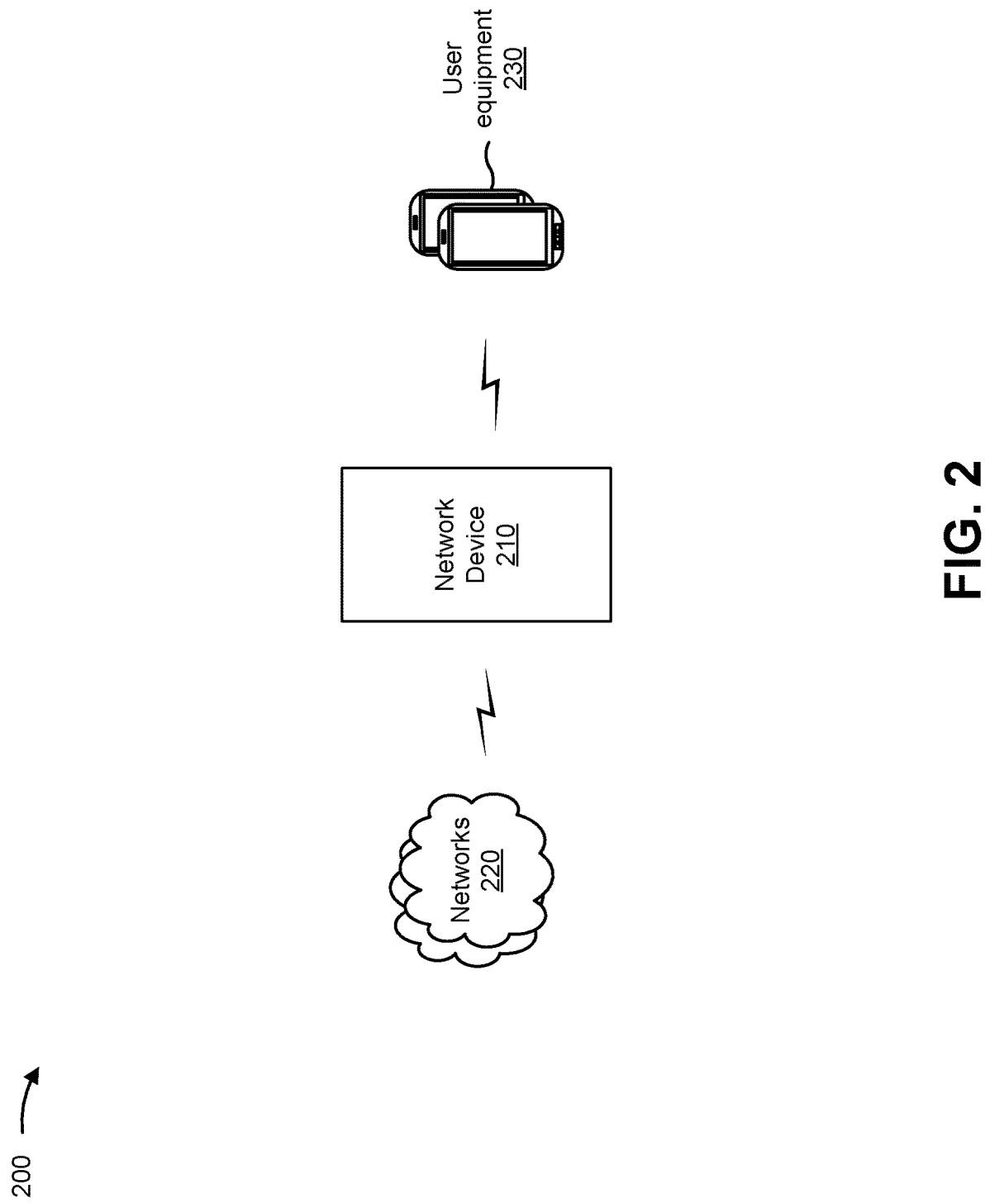
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include network device 210, networks 220, and user equipment (UEs) 230. Devices of environment 200 may interconnect via wired connections, wireless connections, or a combination of wired and wireless connections.

Network device 210 includes one or more devices capable of obtaining and transmitting thermal mitigation guidelines, receiving information, and performing one or more thermal mitigation actions to maintain and/or reduce a temperature of a UE, such as UE 230. For example, network device 210 may include a base station (e.g., an evolved NodeB (eNB), an NR next generation node B (gNB), and/or the like), an access network controller (ANC), a network controller, and/or the like. Network device 210 may correspond to network device 102. Network device 210 may communicate with networks 220 and/or UEs 230 to obtain and transmit the thermal mitigation guidelines, receive the information, and perform the one or more thermal mitigation actions to maintain and/or reduce the temperature of UEs 230.

Networks 220 include different types of cellular networks. For example, networks 220 may include a fifth generation (5G) network, a long-term evolution (LTE) network, a fourth generation (4G) network, a third generation (3G) network, a code division multiple access (CDMA) network, and/or the like. Networks 220 may implement radio access technology (RAT) to enable UEs 230 and network device 210 to communicate with each other, other UEs, and other network devices.

UEs 230 include user equipment capable of receiving, generating, storing, processing, and/or providing information, such as information described herein, and performing one or more thermal mitigation actions to maintain and/or reduce a temperature thereof. For example, UEs 230 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, a user equipment (e.g., user equipment 104, 106, and/or the like), or a similar device. UEs 230 may receive guidelines from network device 210 related to thermal mitigation, may detect a temperature, and may perform one or more thermal mitigation actions to maintain and/or reduce the temperature.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
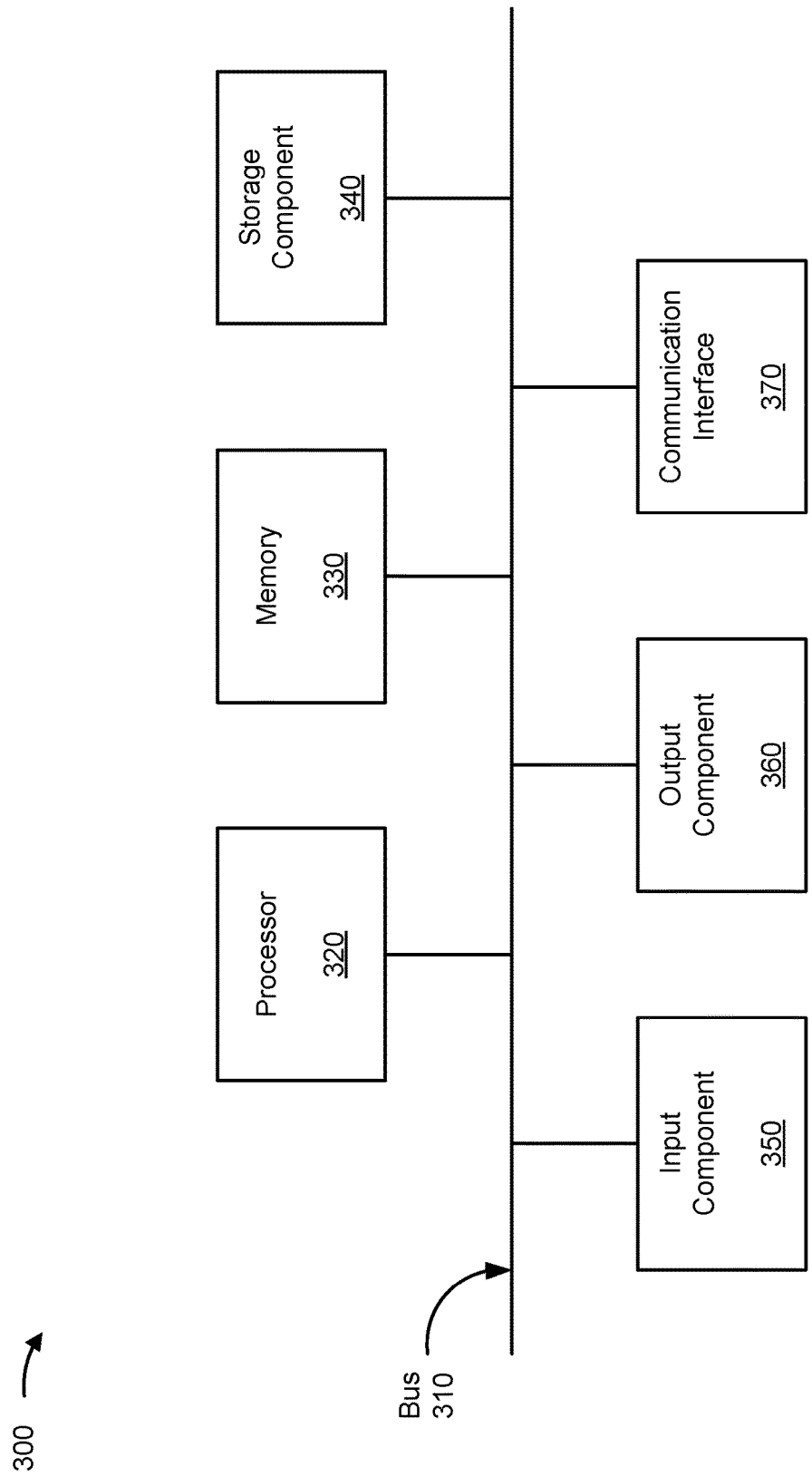
FIG. 3 is a diagram of example components of one or more devices of FIG. 2.

FIG. 3 is a diagram of example components of a device 300. Device 300 may correspond to network device 210 and/or UEs 230. In some implementations, network device 210 and/or UEs 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
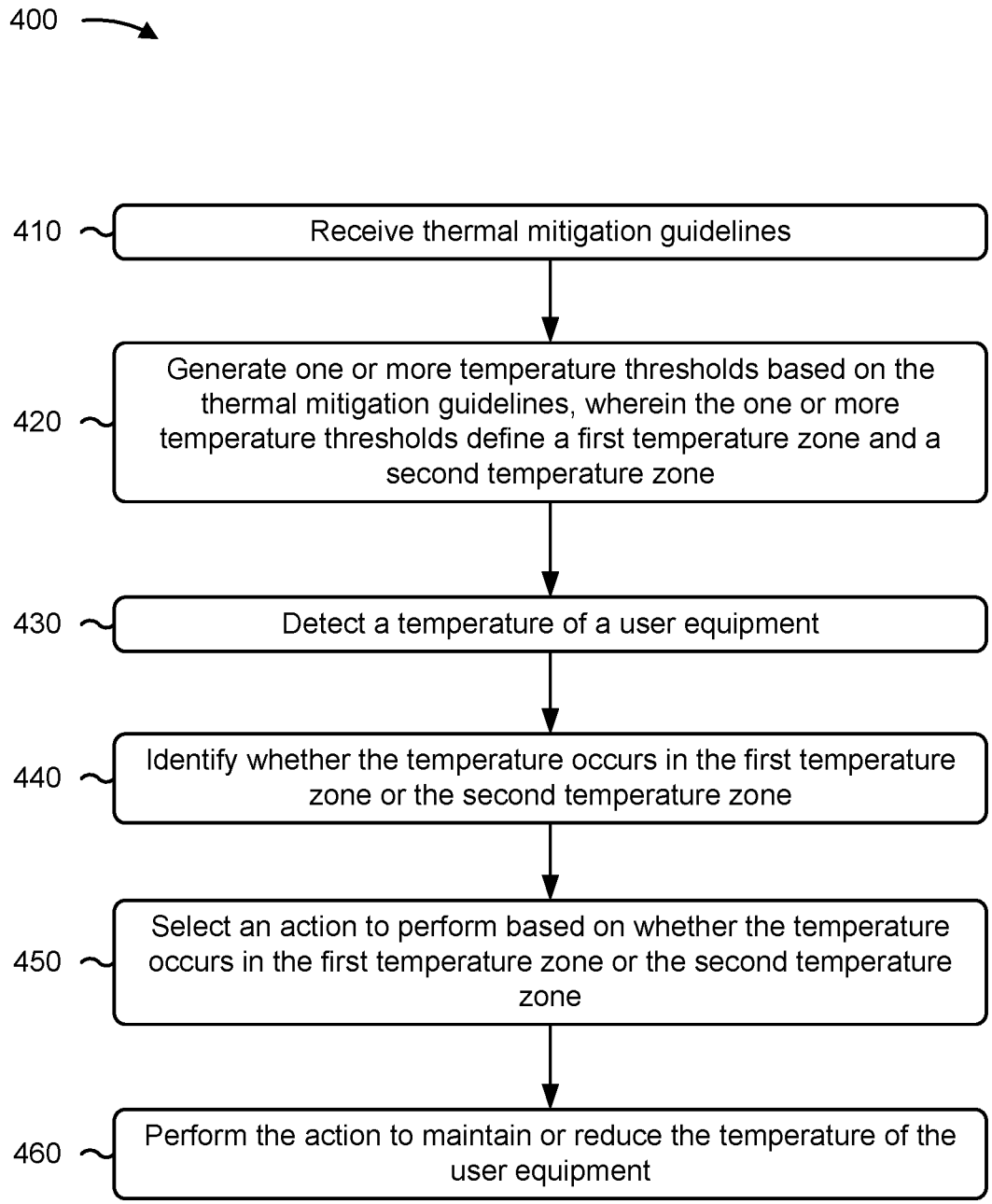
FIG. 4 is a flow chart of an example process for thermal mitigation of a user equipment.

FIG. 4 is a flow chart of an example process 400 for maintaining and/or reducing a temperature of a user equipment. In some implementations, one or more process blocks of FIG. 4 may be performed by a user equipment (UE) (e.g., first UE 104, nth UE 106, UE 230, and/or the like). In some implementations, one or more process blocks of FIG. 4 may be performed by another device or a group of devices separate from or including the user equipment, such as a network device (e.g., network device 102, network device 210, and/or the like).

As shown in FIG. 4, process 400 may include receiving thermal mitigation guidelines (block 410). For example, the user equipment (e.g., using processor 320, memory 330, storage component 340, input component 350, output component 360, communication interface 370 and/or the like) may receive thermal mitigation guidelines, as described above. The thermal mitigation guidelines may be applicable to a plurality of user equipment. The plurality of user equipment may be a plurality of different types of user equipment or a plurality of a same type of user equipment. The thermal mitigation guidelines may provide a protocol to mitigate impact of temperature on the plurality of different types of user equipment. In some implementations, the protocol may include a schedule for the user equipment to detect the temperature. In some implementations, the protocol may indicate that the user equipment is to generate a particular quantity of temperature thresholds and/or define a particular quantity of temperature zones.

As further shown in FIG. 4, process 400 may include generating one or more temperature thresholds based on the thermal mitigation guidelines, wherein the one or more temperature thresholds define a first temperature zone and a second temperature zone (block 420). For example, the user equipment (e.g., using processor 320, memory 330, storage component 340, input component 350, output component 360, communication interface 370 and/or the like) may generate one or more temperature thresholds based on the thermal mitigation guidelines, as described above. Generating the one or more temperature thresholds may comprise obtaining a machine learning model to generate the one or more temperature thresholds, where the machine learning model may have been trained to generate the one or more temperature thresholds based on historical information regarding user equipment characteristics, historical information regarding temperature thresholds, and historical information regarding user equipment performance. The one or more temperature thresholds may define a plurality of temperature zones, which includes a first temperature zone and a second temperature zone. The one or more temperature thresholds may include a temperature threshold that separates the first temperature zone from the second temperature zone. The one or more temperature thresholds may include a temperature threshold that defines a lower bound of the second temperature zone.

In some implementations, generating the one or more temperature thresholds may include generating a plurality of temperature thresholds. Generating the plurality of temperature thresholds may include utilizing a first machine learning model to generate the plurality of temperature thresholds. The plurality of temperature thresholds may include a first temperature threshold and a second temperature threshold. The plurality of temperature thresholds may define a plurality of temperature zones. The plurality of temperature zones may include a first temperature zone, a second temperature zone, and a third temperature zone. The first temperature threshold may separate the first temperature zone from the second temperature zone, and the second temperature threshold may separate the second temperature zone from the third temperature zone.

As further shown in FIG. 4, process 400 may include detecting a temperature of the user equipment (block 430). For example, the user equipment (e.g., using processor 320, memory 330, storage component 340, input component 350, output component 360, communication interface 370 and/or the like) may detect a temperature of the user equipment, as described above. Detecting the temperature may be according to a schedule. The schedule may be indicated by the protocol. The schedule may indicate a frequency for detecting the temperature of the user equipment, and the frequency may increase as the temperature increases.

As further shown in FIG. 4, process 400 may include identifying whether the temperature occurs in the first temperature zone or the second temperature zone (block 440). For example, the user equipment (e.g., using processor 320, memory 330, storage component 340, input component 350, output component 360, communication interface 370 and/or the like) may identify whether the temperature occurs in the first temperature zone or the second temperature zone, as described above. Identifying whether the temperature occurs in the first temperature zone or the second temperature zone may include identifying whether the temperature occurs in the first temperature zone, the second temperature zone, or the third temperature zone. Identifying whether the temperature occurs in the first temperature zone, the second temperature zone, or the third temperature zone, may include identifying that the temperature occurs in the first temperature zone, the second temperature zone, or the third temperature zone. Identifying whether the temperature occurs in the first temperature zone or the second temperature zone may include determining whether the temperature satisfies a temperature threshold of the one or more temperature thresholds.

As further shown in FIG. 4, process 400 may include selecting an action to perform based on whether the temperature occurs in the first temperature zone or the second temperature zone (block 450). For example, the user equipment (e.g., using processor 320, memory 330, storage component 340, input component 350, output component 360, communication interface 370 and/or the like) may select an action to perform based on whether the temperature occurs in the first temperature zone or the second temperature zone, as described above. In some implementations, selecting the action may be based on whether the temperature occurs in the first temperature zone, the second temperature zone, or the third temperature zone. The action may be configured to maintain the temperature within the first temperature zone or reduce the temperature to occur in the first temperature zone. The action may be configured to maintain the temperature within the first temperature zone or reduce the temperature to cause the temperature to switch from the second temperature zone to the first temperature zone. The action may be one of a plurality of actions, and the plurality of actions may include: reducing brightness of a display of the user equipment, placing the user equipment into a battery saver mode, placing the user equipment into an airplane mode, deactivating background data of the user equipment, closing one or more applications on the user equipment, disabling new radio, or sending information to a network device to cause the network device to perform one or more network actions to maintain or reduce the temperature.

In some implementations, selecting the action may include selecting a proactive action or a reactive action based on the temperature and based on whether the temperature occurs in the first temperature zone or the second temperature zone. Selecting the proactive action or the reactive action may comprise obtaining a machine learning model to select the proactive action or the reactive action, the machine learning model may have been trained to select the proactive action or the reactive action based on historical information regarding user equipment characteristics, historical information regarding proactive actions and reactive actions, and historical information regarding results of the proactive actions and the reactive actions.

The proactive action may be configured to maintain or reduce the temperature within the first temperature zone. The reactive action may be configured to reduce the temperature to cause the temperature to switch from the second temperature zone to the first temperature zone. The proactive action or the reactive action may include one or more of: reducing brightness of a display of the user equipment, placing the user equipment into a battery saver mode, placing the user equipment into an airplane mode, deactivating background data of the user equipment, closing one or more applications on the user equipment, or sending information to a network device to cause the network device to perform one or more actions to maintain or reduce the temperature. The proactive action may includes sending information to a network device to cause the network device to perform one or more network actions. The one or more network actions may include one or more of: enabling discontinuous reception on the user equipment, deactivating one or more secondary component carriers used by the user equipment, reducing physical downlink control channel monitoring, or enabling cross-carrier scheduling.

As further shown in FIG. 4, process 400 may include performing the action to maintain or reduce the temperature of the user equipment (block 460). For example, the user equipment (e.g., using processor 320, memory 330, storage component 340, input component 350, output component 360, communication interface 370 and/or the like) may perform the action to maintain or reduce the temperature of the user equipment, as described above. Performing the action may include selectively performing the proactive action or the reactive action. Performing the action may include, based on the temperature occurring in the first temperature zone, sending information to a network device to cause the network device to enable connected mode discontinuous reception on the user equipment, enable a buffer-based deactivation of one or more secondary component carriers used by the user equipment, reduce physical downlink control channel monitoring, or enable cross-carrier scheduling. Performing the action may include, based on the temperature occurring in the second temperature zone, sending information to the network device to cause the network device to deactivate one or more secondary component carriers used by the user equipment, enable a buffer-based E-UTRAN new radio dual connectivity configuration, selectively disable new radio when the user equipment is on voice over long-term evolution, transmit background data from the user equipment over long-term evolution, reduce physical downlink control channel monitoring, or enable cross-slot scheduling. Performing the action may include disabling new radio based on the temperature occurring in the third temperature zone.

In some implementations, process 400 may include repeating, one or more times, the detecting, the identifying, the selecting, and the performing until the temperature of the user equipment occurs in the first temperature zone.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 defining, by a user equipment, a first temperature zone and a second temperature zone based on thermal mitigation guidelines;
 detecting, by the user equipment, a temperature of the user equipment;
 identifying, by the user equipment, whether the temperature occurs in the first temperature zone or the second temperature zone;
 obtaining, by the user equipment and based on identifying whether the temperature occurs in the first temperature zone or the second temperature zone,
 a machine learning model for use in selecting one or more actions to maintain or reduce the temperature,
  wherein the machine learning model has been trained using historical information regarding user equipment characteristics, historical information regarding actions performed to maintain or reduce temperature, and historical information regarding results of the actions;
 inputting, by the user equipment and into the machine learning model, data relating to one or more characteristic parameters of the user equipment to cause the machine learning model to output data relating to one or more actions; and
 performing, by the user equipment and based on the machine learning model outputting the data relating to the one or more actions, the one or more actions to maintain or reduce the temperature within the first temperature zone or to reduce the temperature to cause the temperature to switch from the second temperature zone to the first temperature zone.

2. The method of claim 1, further comprising:
 receiving, from a network operator, the thermal mitigation guidelines,
  wherein the thermal mitigation guidelines are applicable to a plurality of different types of user equipment.

3. The method of claim 2, wherein detecting the temperature of the user equipment is based on a schedule provided in the thermal mitigation guidelines.

4. The method of claim 1, wherein defining the first temperature zone and the second temperature zone comprises utilizing a second machine learning model to generate a temperature threshold; and
 wherein the temperature threshold separates the first temperature zone from the second temperature zone.

5. The method of claim 4, wherein the second machine learning model has been trained to generate the temperature threshold based on historical information regarding user equipment characteristics, historical information regarding temperature thresholds, and historical information regarding user equipment performance.

6. The method of claim 1, wherein the one or more actions include sending information to a network device to cause the network device to perform one or more network actions, and
 wherein the one or more network actions include one or more of:
  enabling discontinuous reception on the user equipment,
  enabling cross-carrier scheduling,
  deactivating one or more secondary component carriers used by the user equipment,
  reducing physical downlink control channel monitoring,
  enabling cross-slot scheduling,
  enabling a buffer-based E-UTRAN new radio dual connectivity configuration,
  selectively disabling new radio when the user equipment is on voice over long-term evolution, or
  transmitting background data from the user equipment over long-term evolution.

7. The method of claim 1, wherein the one or more actions include one or more of:
 reducing brightness of a display of the user equipment,
 placing the user equipment into a battery saver mode,
 placing the user equipment into an airplane mode,
 deactivating background data of the user equipment,
 closing one or more applications on the user equipment, or
 sending information to a network device to cause the network device to perform one or more network actions to maintain or reduce the temperature.

8. A user equipment, comprising:
 one or more processors configured to:
  define a first temperature zone, a second temperature zone, and a third temperature zone;
  detect a temperature of the user equipment;
  identify whether the temperature occurs in the first temperature zone, the second temperature zone, or the third temperature zone;
  obtain, based on identifying whether the temperature occurs in the first temperature zone, the second temperature zone, or the third temperature zone,
  a machine learning model for use in selecting an action to maintain or reduce the temperature,
   wherein the machine learning model has been trained using historical information regarding user equipment characteristics, historical information regarding actions performed to maintain or reduce temperature, and historical information regarding results of the actions;
  input, into the machine learning model, data relating to one or more characteristic parameters of the user equipment to cause the machine learning model to output data relating to the action; and
  perform, based on the machine learning model outputting the data relating to the action, the action to maintain the temperature within the first temperature zone or reduce the temperature to be within the first temperature zone.

9. The user equipment of claim 8, wherein the one or more processors are further configured to:
 receive thermal mitigation guidelines,
  wherein the thermal mitigation guidelines indicate that the user equipment is to define a particular quantity of temperature zones.

10. The user equipment of claim 8, wherein the one or more processors, when defining the first temperature zone, the second temperature zone, and the third temperature zone, are configured to utilize a second machine learning model to generate a first temperature threshold and a second temperature threshold.

11. The user equipment of claim 10, wherein the first temperature threshold separates the first temperature zone from the second temperature zone, and the second temperature threshold separates the second temperature zone from the third temperature zone.

12. The user equipment of claim 8, wherein the one or more processors, when identifying whether the temperature occurs in the first temperature zone, the second temperature zone, or the third temperature zone, are configured to identify that the temperature occurs in the first temperature zone;
    wherein the action includes sending information to a network device to cause the network device to perform one or more network actions; and
    wherein the one or more network actions include at least one of:
        enabling connected mode discontinuous reception on the user equipment,
        enabling a buffer-based deactivation of one or more secondary component carriers used by the user equipment,
        reducing physical downlink control channel monitoring, or
        enabling cross-carrier scheduling.

13. The user equipment of claim 8, wherein the one or more processors, when identifying whether the temperature occurs in the first temperature zone, the second temperature zone, or the third temperature zone, are configured to identify that the temperature occurs in the second temperature zone;
    wherein the action includes sending information to a network device to cause the network device to perform one or more network actions; and
    wherein the one or more network actions include at least one of:
        deactivating one or more secondary component carriers used by the user equipment,
        enabling a buffer-based E-UTRAN new radio dual connectivity configuration,
        selectively disabling new radio when the user equipment is on voice over long-term evolution,
        transmitting background data from the user equipment over long-term evolution,
        reducing physical downlink control channel monitoring, or
        enabling cross-slot scheduling.

14. The user equipment of claim 8, wherein the one or more processors, when identifying whether the temperature occurs in the first temperature zone, the second temperature zone, or the third temperature zone, are configured to identify that the temperature occurs in the third temperature zone;
    wherein the action includes sending information to a network device to cause the network device to perform one or more network actions; and
    wherein the one or more network actions include disabling new radio based on the temperature occurring in the third temperature zone.

15. A non-transitory computer-readable medium storing instructions, the instructions comprising:
    one or more instructions that, when executed by one or more processors of a user equipment, cause the one or more processors to:
        generate one or more temperature thresholds based on thermal mitigation guidelines,
            wherein the one or more temperature thresholds define a first temperature zone and a second temperature zone;
        detect a temperature of the user equipment according to a schedule provided in the thermal mitigation guidelines;
        identify whether the temperature occurs in the first temperature zone or the second temperature zone;
        obtain, based on identifying whether the temperature occurs in the first temperature zone or the second temperature zone,
        a machine learning model for use in selecting an action to maintain or reduce the temperature,
            wherein the machine learning model has been trained using historical information regarding user equipment characteristics, historical information regarding actions performed to maintain or reduce temperature, and historical information regarding results of the actions;
        input, into the machine learning model, data relating to one or more characteristic parameters of the user equipment to cause the machine learning model to output data relating to the action; and
        perform, based on the machine learning model outputting the data relating to the action, the action to maintain or reduce the temperature of the user equipment.

16. The non-transitory computer-readable medium of claim 15, wherein the thermal mitigation guidelines are applicable to a plurality of a same type of user equipment.

17. The non-transitory computer-readable medium of claim 15, wherein the schedule indicates a frequency for detecting the temperature of the user equipment; and
    wherein the frequency increases as the temperature increases.

18. The non-transitory computer-readable medium of claim 15, wherein the one or more temperature thresholds includes a temperature threshold that defines a lower bound of the second temperature zone; and
    wherein the one or more instructions, that cause the one or more processors to identify whether the temperature occurs in the first temperature zone or the second temperature zone, cause the one or more processors to determine whether the temperature satisfies the temperature threshold.

19. The non-transitory computer-readable medium of claim 15, wherein the one or more instructions cause the one or more processors to identify that the temperature occurs in the second temperature zone and further cause the one or more processors to repeat the detecting and the identifying until the temperature of the user equipment occurs in the first temperature zone.

20. The non-transitory computer-readable medium of claim 15, wherein the action includes one or more of:
    reducing brightness of a display of the user equipment,
    placing the user equipment into a battery saver mode,
    placing the user equipment into an airplane mode,
    deactivating background data of the user equipment,
    closing one or more applications on the user equipment, or sending information to a network device to cause the network device to perform one or more network actions to maintain or reduce the temperature,
wherein the one or more network actions include one or more of:
  enabling discontinuous reception on the user equipment,
  enabling cross-carrier scheduling,
  deactivating one or more secondary component carriers used by the user equipment,
  reducing physical downlink control channel monitoring,
  enabling cross-slot scheduling,
  enabling a buffer-based E-UTRAN new radio dual connectivity configuration,
  selectively disabling new radio when the user equipment is on voice over long-term evolution, or
  transmitting background data from the user equipment over long-term evolution.

* * * * *